Figure 1:
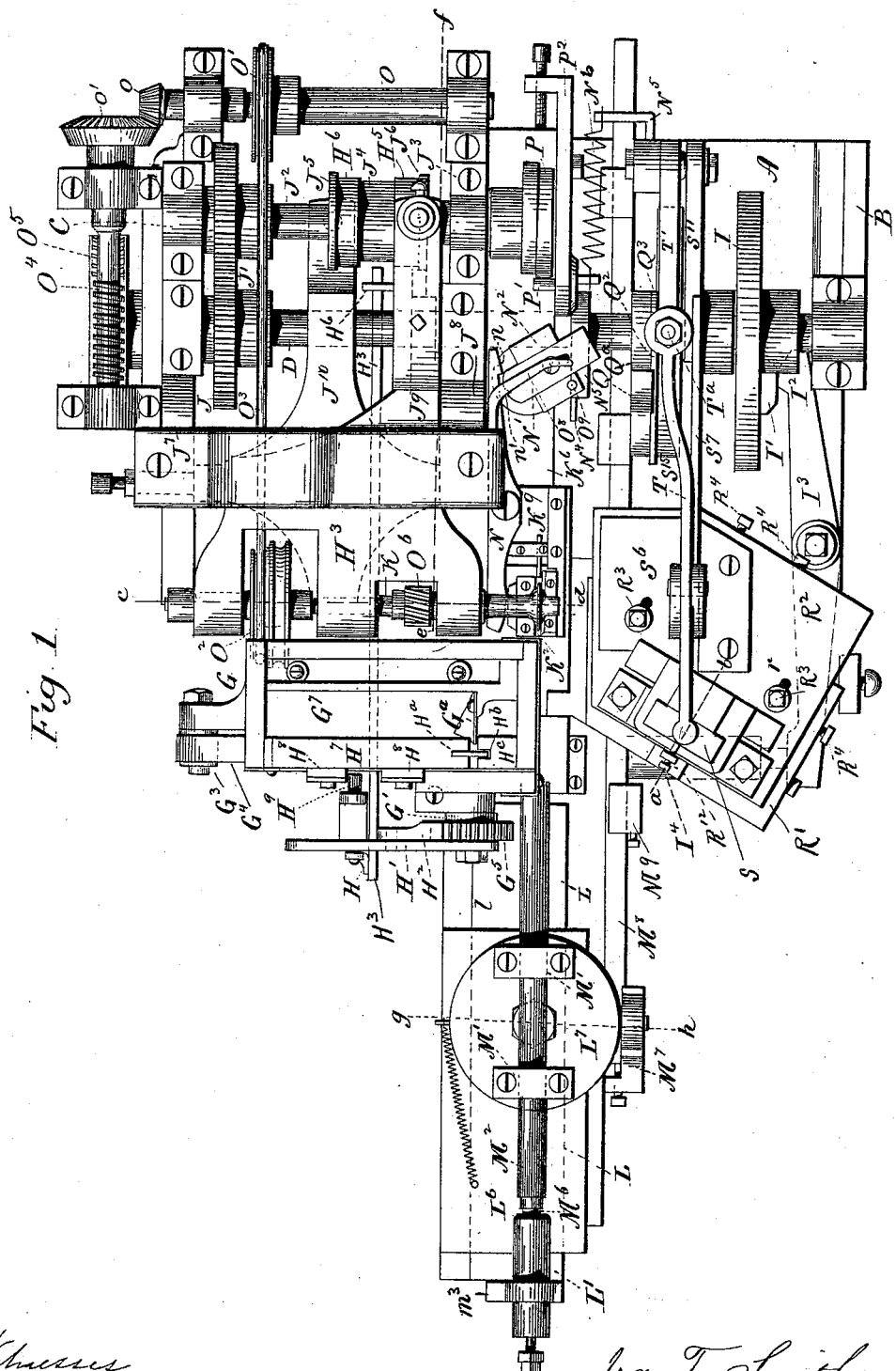

(No Model.) 8 Sheets—Sheet 1.

I. T. SMITH.
MACHINE FOR GROOVING AND PUNCHING NEEDLE BLANKS.

No. 512,912. Patented Jan. 16, 1894.

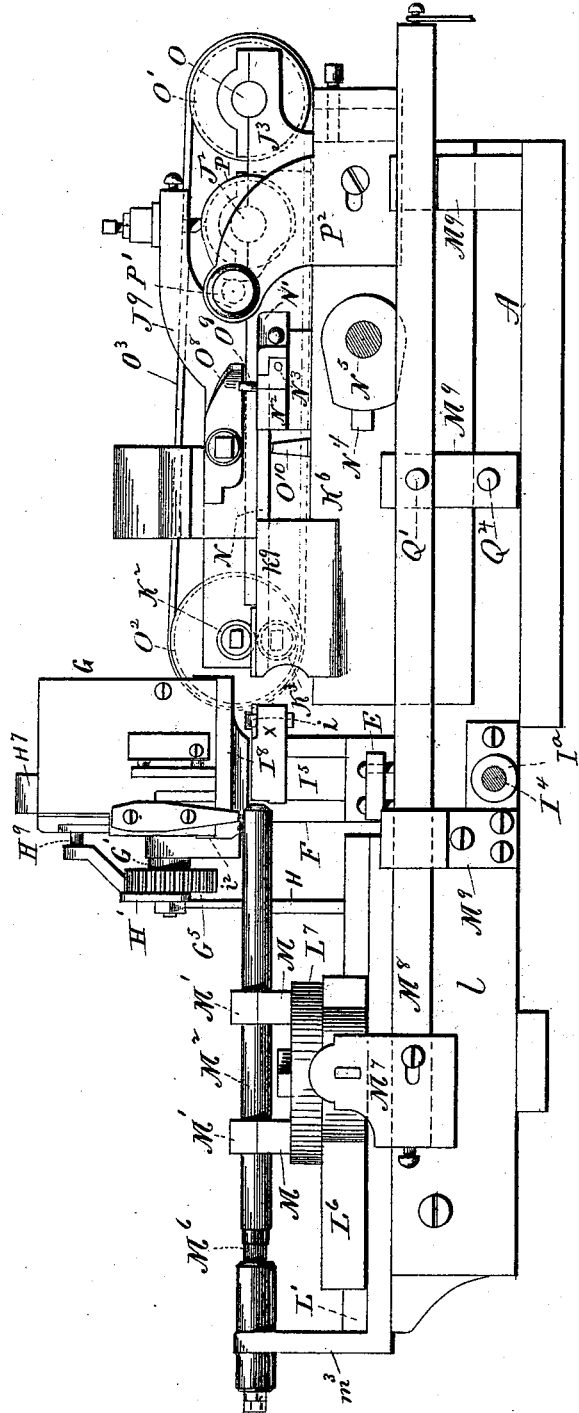

(No Model.) 8 Sheets—Sheet 3.
I. T. SMITH.
MACHINE FOR GROOVING AND PUNCHING NEEDLE BLANKS.
No. 512,912. Patented Jan. 16, 1894.
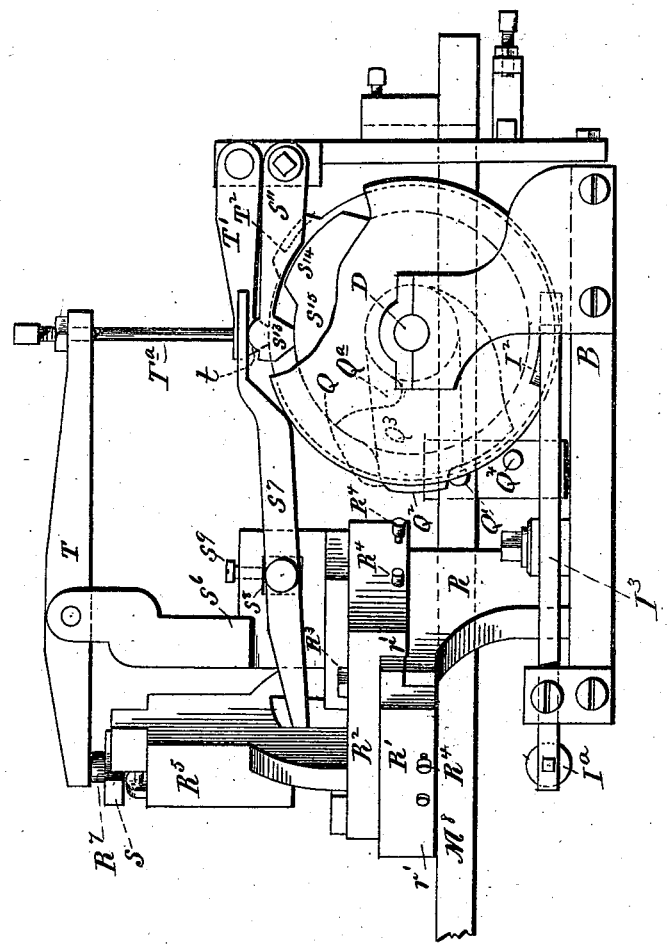
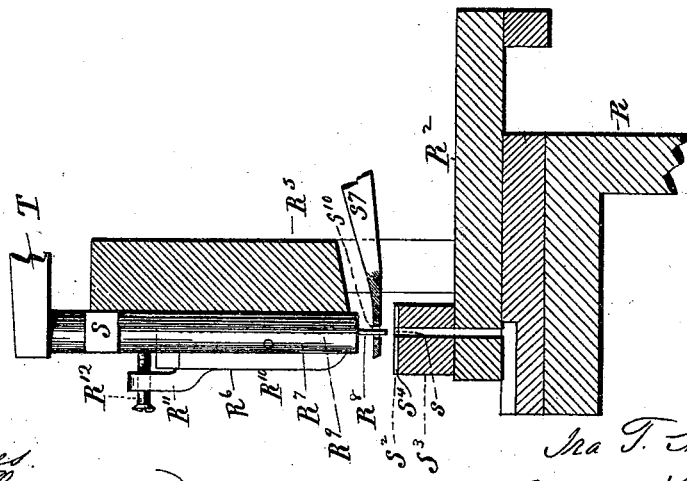

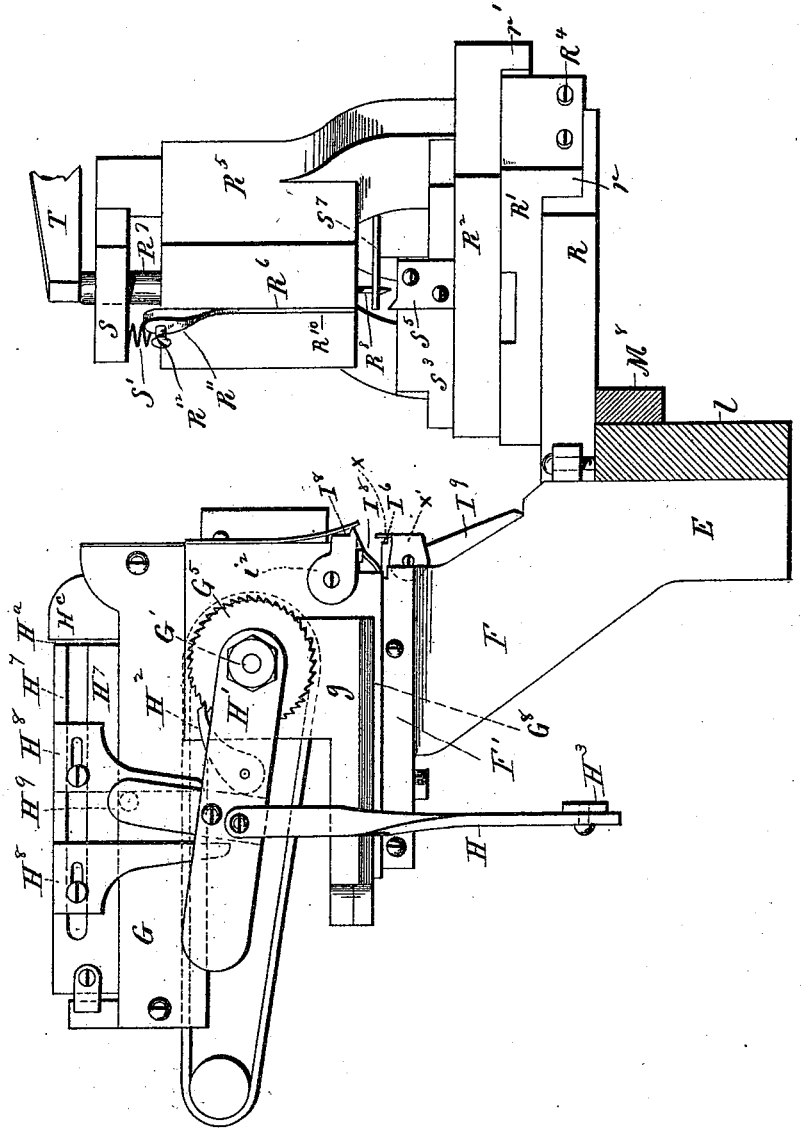

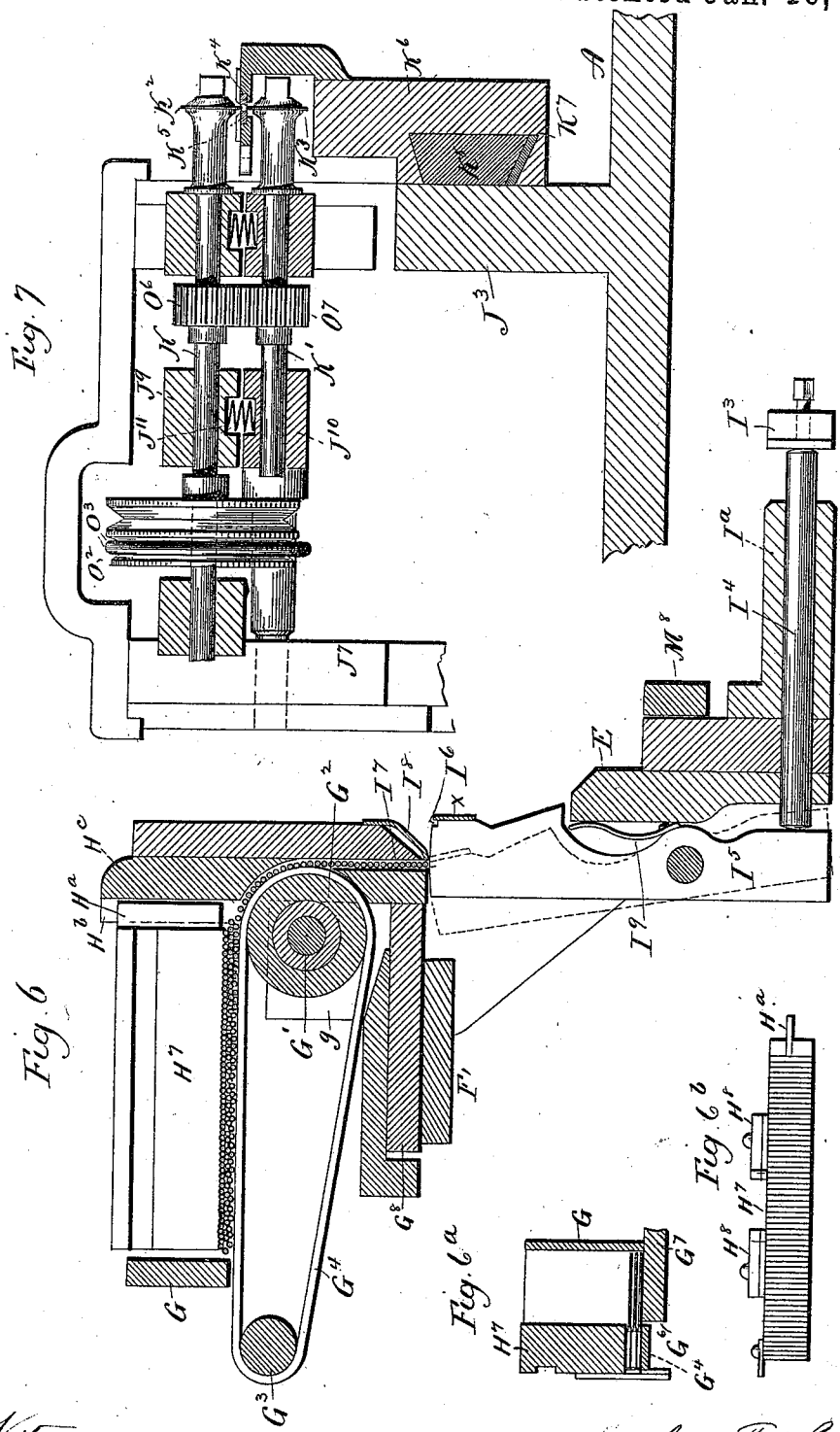

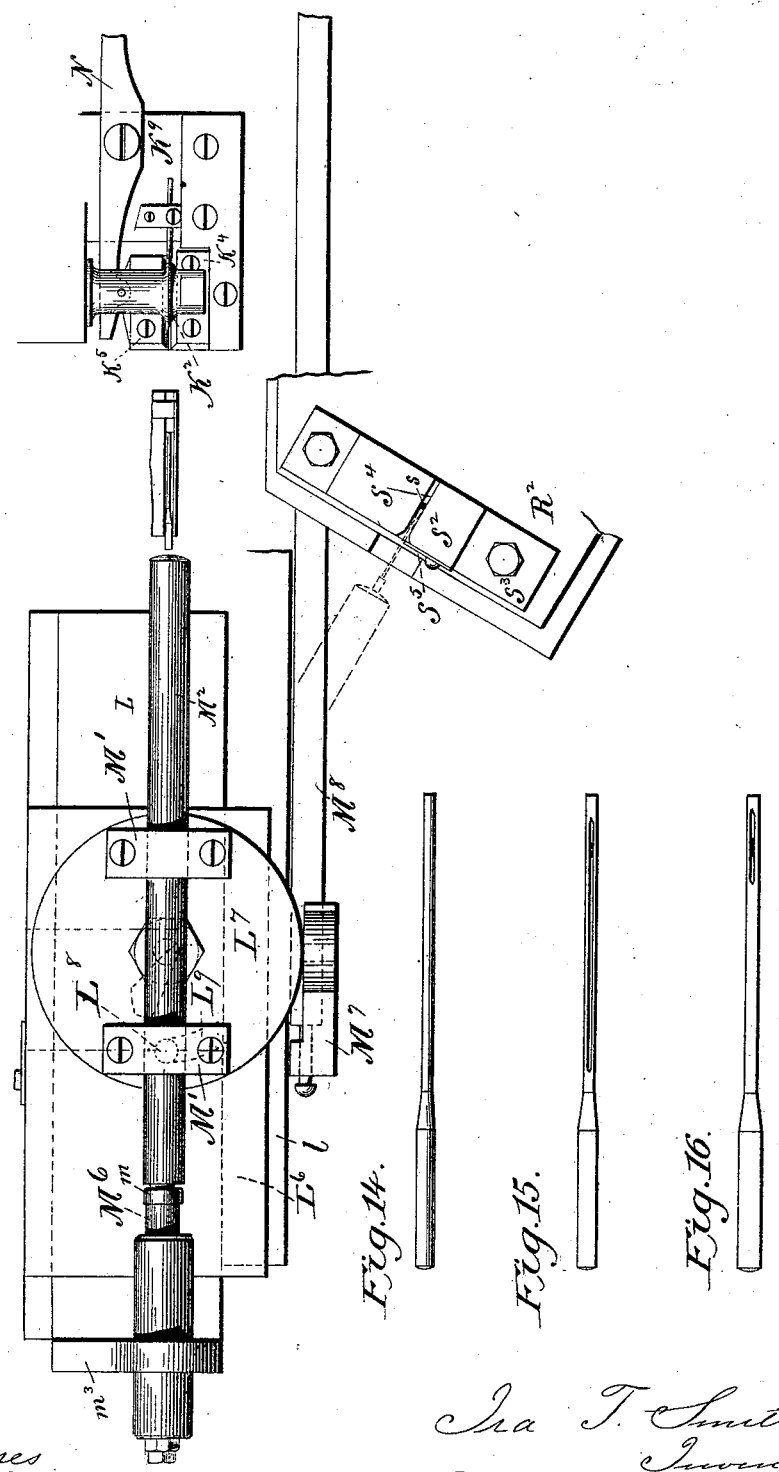

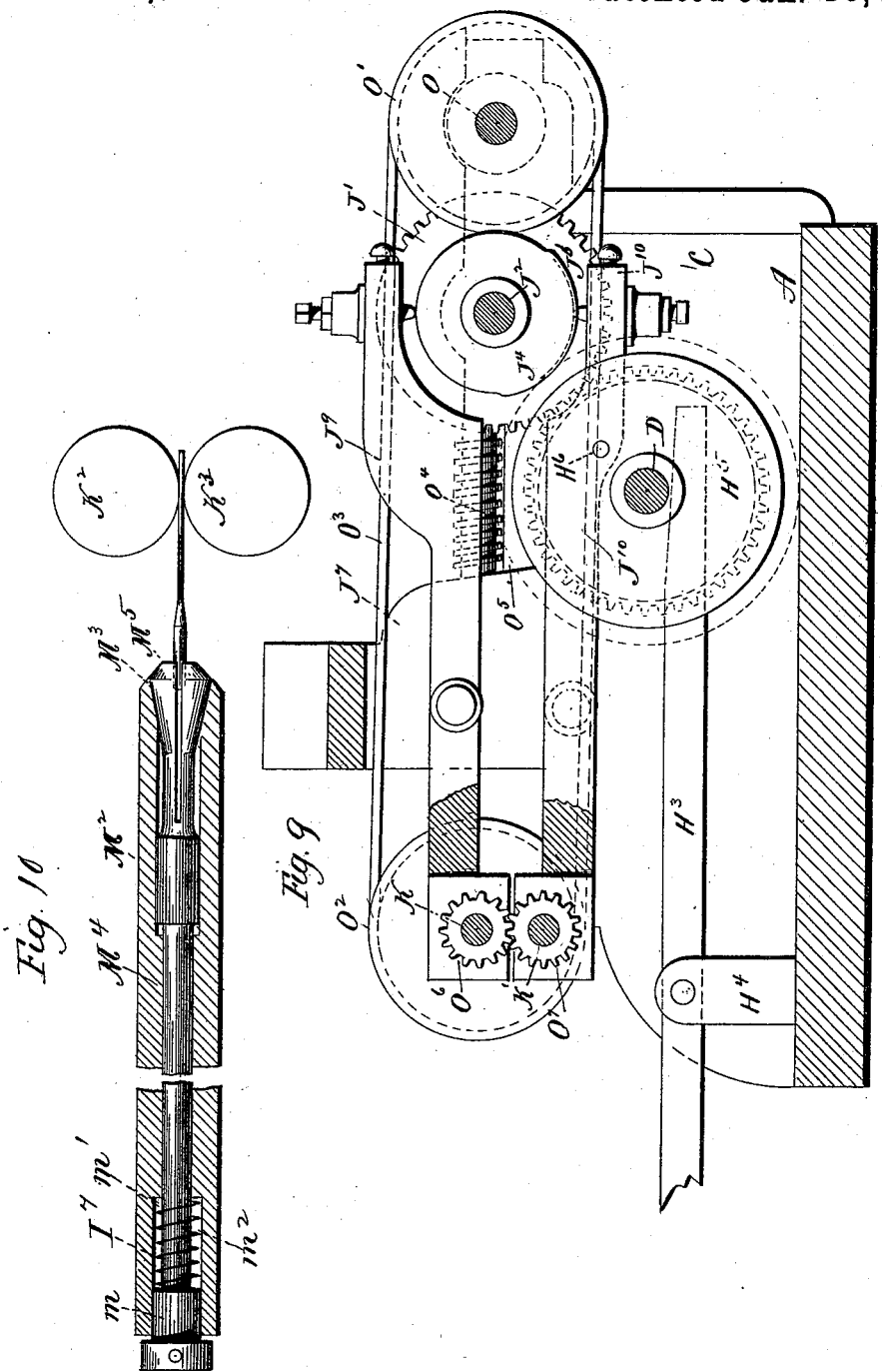

(No Model.) 8 Sheets—Sheet 8.
I. T. SMITH.
MACHINE FOR GROOVING AND PUNCHING NEEDLE BLANKS.
No. 512,912. Patented Jan. 16, 1894.
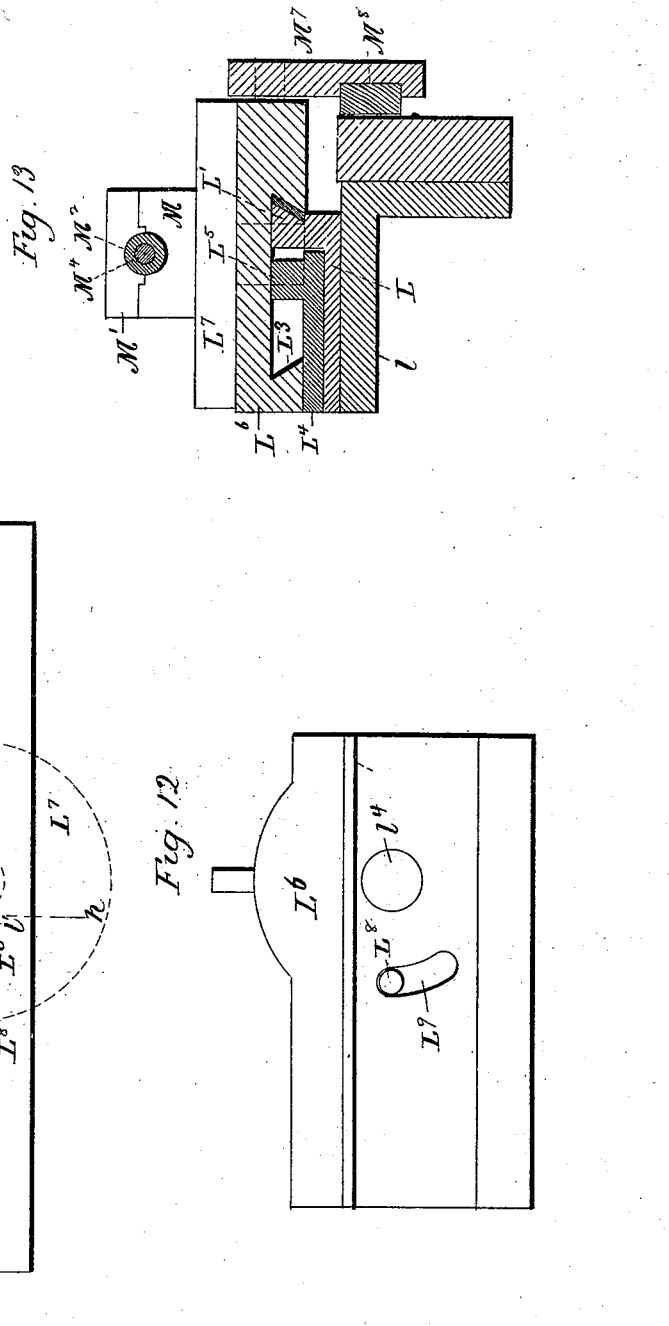

UNITED STATES PATENT OFFICE.

IRA T. SMITH, OF MOUNT CARMEL, CONNECTICUT.

MACHINE FOR GROOVING AND PUNCHING NEEDLE-BLANKS.

SPECIFICATION forming part of Letters Patent No. 512,912, dated January 16, 1894.

Application filed July 15, 1893. Serial No. 480,600. (No model.)

*To all whom it may concern:*

Be it known that I, IRA T. SMITH, of Mount Carmel, in the county of New Haven and State of Connecticut, have invented a new Improvement in Machines for Grooving and Punching Needle-Blanks; and I do hereby declare the following, when taken in connection with accompanying drawings and the letters of reference marked thereon, to be a full, clear, and exact description of the same, and which said drawings constitute part of this specification, and represent, in—

Figure 1, a plan view of a machine embodying my invention; Fig. 2, a view in side elevation with the punching mechanism removed; Fig. 3, a view in side elevation of the punching mechanism, together with a few other parts of the machine; Fig. 4, a view partly in side elevation and partly in vertical section on the line $a$—$b$ of Fig. 1; Fig. 5, a view in front elevation of the blank-feeding and punching mechanism with the machine-bed and the operating-bar of the blank-carrier in transverse section; Fig. 6, an enlarged view in vertical longitudinal section of the blank feeding mechanism, including the hopper; Fig. $6^a$, a view in transverse section through the hopper and weight; Fig. $6^b$, a detached reverse plan view of the weight; Fig. 7, an enlarged view in vertical transverse section on the line $c$—$d$ of Fig. 1, and showing the groove-cutting mechanism; Fig. 8, an enlarged broken plan view showing the blank-carrying mechanism; Fig. 9, an enlarged view in vertical longitudinal section on the line $e$—$f$ of Fig. 1, and showing the devices employed for operating the groove-cutters; Fig. 10, an enlarged view in longitudinal section of the chuck of the blank-carrying mechanism; Fig. 11, an enlarged broken plan view of the extension of the machine-bed, showing the devices employed to oscillate the turret which carries the chuck; Fig. 12, an enlarged detached reverse plan view of the turret-slide; Fig. 13, an enlarged view in cross section on the line $g$—$h$ of Fig. 1; Fig. 14, a view of the needle-blank; Fig. 15, a view of one side of the same after it has been grooved and punched; Fig. 16, a similar view of the other side of the needle.

My invention relates to a machine for grooving and punching needle-blanks, the object being to provide a compact and effective improved automatic machine adapted to perform both of those operations accurately and rapidly, whereas heretofore needle-blanks have been usually grooved in one machine and then manually fed to and punched in another machine, because automatic machines heretofore devised have not proved practical or effective in use.

With these ends in view, my invention consists in the combination with grooving and punching mechanism, of a chuck or needle-carrier constructed and arranged to present a blank to the former, and then automatically shift it to the latter.

My invention further consists in a machine having certain details of construction and combinations of parts as will be hereinafter described, and pointed out in the claims.

As herein shown, the several mechanisms of the machine are mounted upon a base-plate or bed A, constructed near its opposite ends with upright standards B and C, having bearings in which the main driving-shaft D is journaled in a horizontal position.

At the forward end of the base-plate A, is an upright E, Fig. 2, with separated branches F (Figs. 5 and 6) above which on table F' thereof is arranged an elongated needle-feed box or hopper G, having a longitudinal slot $G^6$ formed in one edge of its bottom $G^7$. Below the said hopper G, and supported by the foot-piece $G^8$ which is secured to table F' (between which foot-piece and the hopper is located a chute to be described) is a bracket $g$ adjustable on said foot-piece, in which is journaled a short horizontal shaft G'.

Mounted upon shaft G' is a belt-pulley $G^2$, preferably of raw-hide, over which and a pulley $G^3$ supported at the outer end of the hopper, is trained an endless blank feeder or belt $G^4$, the said belt running in the slot $G^6$ in the bottom of the hopper, with its carrying surface extending very slightly above the same. The heads of the said needle-blanks rest upon said belt, so that the needles may be fed forward by it. The shaft G' is provided at its end, outside the hopper G, with a ratchet-wheel $G^5$; and pivoted at one end on said shaft G', and at its other end to a vertical rod H, is a connecting-piece or link H', carrying a pivotal pawl or dog $H^2$, for engagement with the teeth of the ratchet-wheel G⁵. To the lower end of the rod H, is pivoted one end of a rocking-lever H³, fulcrumed between its ends in a bracket H⁴, secured to the base-plate A, as shown in Fig. 9. The free end of the lever H³, extends under the main driving-shaft D, in operative relation to a wheel or disk H⁵, rigidly secured to the main driving-shaft, and carrying a laterally projecting pin H⁶, which, during each rotation of said wheel or disk, strikes and depresses the free end of the lever H³, raising its other end, and through the medium of the vertical rod H, connecting-piece H' and pawl H², rotating the ratchet-wheel G⁵, the distance of one tooth. In this manner the endless feeder or belt G⁴ is made to travel intermittently to feed the needles at given intervals.

The hopper G is fitted with a removable weight H⁷, constituting a gravitating follower, that presses the needles down against the endless feeder or belt G⁴, and which is corrugated or serrated on its bottom edge, as shown in Figs. 6 and 6ᵇ, the serrations or corrugations conforming in shape to and adapted to receive the heads of the needle-blanks. Said follower H⁷ is retained in position by a tongue Hᵃ formed thereon at one end, and fitting into a groove Hᵇ in the block Hᶜ fixed in the front end of the hopper, and its length is slightly less than that of the hopper, so that it is capable of a slight longitudinal movement therein, equal to the distance between the several teeth of the ratchet-wheel G⁵, so that it will operate in unison with said ratchet-wheel, and accurately guide the needles being fed, to deliver them from the hopper in proper position. This longitudinal movement is imparted to the follower H⁷, by means of a pin H⁹, carried by the connecting link H', and entering the space between two arms H⁸, secured to the side of the follower. When the free end of the rocking-lever H³ is depressed, as before described, the pin H⁹ presses against one of these arms H⁸, moving the follower longitudinally for the purpose described, and when the free end of the rocking-lever H³ rises, after the passage of the pin H⁶, the follower is moved back by the pin H⁹ striking the other arm H⁸. These arms are adjustable, as shown in the drawings, to control the extent of longitudinal movement of the follower or weight H⁷.

At the delivery end of the feed-hopper G, to one side of the endless feeder or belt, is arranged a guide-plate Gᵃ, which lies close to the bottom of the hopper, and prevents more than one layer of needle-blanks to pass thereunder, and be delivered from the hopper at a time.

Upon the main driving-shaft D, near one end, is mounted a wheel I, having upon its face a cam-projection I', with which engages the cam-shaped end I² of a lever I³, pivoted to the base-plate A, being connected to the end of a reciprocating rod or plunger I⁴, passing through a tubular guide Iᵃ as shown in Figs. 1 and 6, the other end of which plays against the lower end of a rocking-arm I⁵, pivoted in the upright E, and lying in the recess formed by the branches F. This arm I⁵, at its upper end, extends into a recess in the table F', and lies closely against the delivery end of the chute I⁷ projecting downwardly from the front end of the hopper, and at its front edge is formed with a needle-blank receiving groove I⁶, which normally, and as shown in dotted lines in Fig. 6, registers with the delivery end of the chute I⁷, into which chute the needle blanks are carried by the belt G⁴, and wherein they fall by gravity to its delivery end.

A movable holder or plate $x$ is located at the outer side of the needle-blank receiving groove I⁶, so as to prevent the blank from falling out, and said plate has at each end ears $x'$ which are pivotally connected with each side of said arm I⁵. At the inner end of the groove I⁶ is a stop $i$ which constitutes an abutment for the points of the blanks. To the front wall of the chute is secured a swinging gate or stop I⁸ having ears $i²$ at each end, which are pivoted to the sides of the chute, and the nose of which lies at the end thereof, and is engaged by the lowermost needle-blank, being swung away therefrom to permit a needle-blank to drop into the groove I⁶, by frictional contact with the rear upper surface of the rocking-arm I⁵. In this manner the needle-blanks are delivered one by one into the receiving groove I⁶. When during the rotation of the wheel I, the cam I' engages the cam-shaped end of the lever I³, the reciprocating plunger is forced against the rocking-arm I⁵, thereby throwing the upper end of said arm with a needle-blank lying therein to the forward position shown in full lines in Figs. 5 and 6 of the drawings, and swinging the stop-gate I⁸ away from the chute I⁶. The needle-blank is now in position to be taken by the chuck which carries it to the groove-cutters. After the blank is taken from the groove I⁶, the rocking arm is moved back to its rearward position to receive another blank in the groove, by a spring I⁹, bearing thereagainst, and against the upright E.

I will now proceed to describe the cutting mechanism for grooving the needles and the means for operating the same. Upon the main driving-shaft D, is mounted a gear-wheel J, meshing with a similar wheel J', mounted upon a shaft J², journaled in bearings formed in the standard C and a vertical support J³ and by means of which said shaft is rotated. Upon said shaft is mounted a hub J⁴, having at its opposite ends peripheral cams J⁵ and J⁶. In standards J⁷, J⁸ secured to the base-plate A, are fulcrumed upper and lower rocking-frames J⁹ and J¹⁰ respectively, the rear ends of which rocking-frames extend to, and above and below, the hub J⁴, and in operative relation, respectively, with the cams J⁵ and J⁶. In the front ends of the rocking-frames are journaled cutter-carrying shafts K K', upon the inner ends of which are located vertically disposed saw-tooth cutters $K^2 K^3$, lying respectively above and below needle-clamps $K^4 K^5$, one of which $K^5$, is movable, as hereinafter explained, and the other is fixed to clamp-bed or block $K^9$ carried by a slide $K^6$, the latter being provided with a dove-tail recess $K^7$, which receives a corresponding dove-tail projection $K^8$, extending from the vertical support $J^3$. From the front of the base-plate projects an extension $l$, on which is arranged a block or stock L, formed with a dove-tail guide $L'$, provided with a longitudinal way or slot $L^2$, which is intersected by a lateral opening $L^3$, in which is fitted a small plate $L^4$, capable of sliding transversely or laterally therein. Secured near the inner edge of this plate on the upper face thereof, is a cam-shaped projection $L^5$, having an oblique face $l'$ on one side, and a face $l^2$ of greater obliquity on the other, said faces meeting in a point or acute angle $l^3$. Sliding back and forth upon the dove-tail guide $L'$, is a support $L^6$, having a corresponding dove-tail recess to fit the guide $L'$. A circular head or turret $L^7$ is swiveled in this support, as shown in the drawings, which head is provided with a downwardly projecting pin $L^8$, which works in an arc-shaped elongated slot $L^9$, formed in the support $L^6$, concentrically with the swivel $l^4$, and limits the turning movement of the swiveled head. The pin $L^8$, also enters the longitudinal slot $L^2$ in the guide $L'$, and in connection with the face of the cam $L^5$, performs the function of turning the head $L^7$, to present the needle-blank to the eye-punching mechanism, as hereinafter described. The sliding plate $L^4$, is pushed outward to permit the passage of the sliding support $L^6$ in its forward movement, by means of the pin $L^8$, striking against the face $l'$ of cam $L^5$, and it is returned to its normal position by a spiral spring $L^{10}$ located internally thereof, and engaged by a projection $L^{11}$ from block L, as will be readily understood. Bearings M, are formed upon the upper surface of the support $L^6$, and confined in said bearings by caps $M'$, is a hollowed out, cylindrical tube $M^2$, (Fig. 10,) having a flaring mouth $M^3$. Within this tube is a longitudinally movable rod $M^4$, the rear end of which extends without the tube, and the front end of which is slitted lengthwise to form needle-gripping jaws $M^5$. The rear end of the rod $M^4$ has a head $m$, which fits in an enlarged chamber $m'$ in the tube $M^2$ against which head a confined spring $m^2$ bears and retracts the rod. When the rear end of the rod $M^4$, strikes against a stationary abutment, hereinafter referred to, the jaws $M^5$ are forced forward out of the tube, and open away from each other to receive the head of the needle-blank from the groove $l^6$, and are then caused to recede into the tube, with the needle firmly grasped by them, by means of the coil-spring $m^2$. The head $m$ of the rod $M^4$, strikes against a suitable buffer or abutment $M^6$, secured on a bracket $m^3$, in front of the dove-tail guide $L'$, at the extreme limit of backward movement of the support $L^6$, whereby the jaws $M^5$, are forced out of the tube or cylinder, and opened to receive the needle-blank. The supporting block $L^6$, is connected by a suitable detachable coupling device $M^7$, to a strong metallic strip $M^8$, which is adapted to reciprocate in bearings formed therefor in brackets $M^9$, attached to the base-piece A. The bar or strip $M^8$, and the attached support $L^6$, and the parts carried thereby, are moved forward in any suitable manner, as by a spring (not shown) the pin $L^8$ depending from the swivel head $L^7$, entering between the inclined edge $l'$ of the cam $L^5$, and the wall of the longitudinal recess $L^2$, thus forcing the cam out of the way of progress, and immediately after the pin has cleared the cam, said cam is returned to its place by the spring $L^{10}$ acting upon the sliding-plate $L^4$. Fulcrumed to the clamp-bed or block $K^9$, is a lever N, the inner end of which is pivoted to the movable clamp $K^5$, and the other end is provided with a lip $n$, which works upon the eccentric face of an adjustable cam-plate $N'$, carried by a support $N^2$, swiveled to the slide $K^6$, and having a pin $N^3$, (Fig. 2) extending laterally therefrom. Said pin is struck by a projection $N^4$, from a plate $N^5$, secured to and rotating with the main driving-shaft D, and so timed in its rotation that it strikes the pin $N^3$, and turns the swiveled support $N^2$, so that the cam face on the plate $N'$, forces the end of the lever with which it engages in a direction to clamp the stem of the needle-blank between the clamps $K^4 K^5$ at the moment the chuck $M^2$ presents the needle. From this point the chuck $M^2$ and the clamps $K^4 K^5$ travel forward in unison, the needle-stem passing between the stationary rotary cutters $K^2 K^3$, which form the grooves therein. The rearward movement of the clamps is imparted by a strong spring $N^6$, one end of which is secured to a post $N^5$ secured to the base-plate, and the other end of which is secured to the slide $K^6$.

The cutters $K^4 K^5$ are driven in the following manner: Journaled in bearings secured to the standard C, and the upright $J^3$, is a shaft O, carrying a grooved pulley $O'$, and on the cutter-shaft K, is mounted a double-grooved pulley $O^2$, over which pulleys is trained a driving-belt $O^3$. The shaft O, carries a pinion $o$, which meshes with a gear-wheel $o'$, mounted upon the end of a worm-shaft $O^4$, journaled in bearings secured to the standard C, with which worm-shaft a worm-wheel $O^5$ mounted upon the main driving-shaft D, meshes, and transmits motion to the cutter-shaft K. The cutter-shafts K and $K'$ are provided with intermeshing gears $O^6$ and $O^7$, whereby motion is imparted to the lower shaft $K'$ from shaft K. The cams $J^5$ and $J^6$ upon the hub $J^4$, are of different lengths, that cam with which the upper rocking-frame $J^9$ engages being of greater length than the cam which engages the rocking-frame $J^{10}$, so that the cutter which acts upon the lower side of the needle makes a short groove, and that which operates upon the upper side of the needle makes a long groove, extending a slight distance upon each side of the point where the eye is to be punched, the cutters being in operative contact with the needle only when the rear ends of the rocking frames are pushed away from the said hub by the cams $J^5 J^6$ with which they are kept in engagement by a spring $J^{11}$ interposed between the forward ends of the frames. As soon as the cutters $K^2 K^3$ have finished their work, and the grooves have been formed, the clamps $K^4 K^5$ release the needle through the medium of an arm $O^8$, secured to the upright $J^3$, and which projects into the path of a pin $O^9$, upon the swivel support $N^2$, and turns said support back to its rearward position. The lip upon the end of the lever N, will by this movement, be caused to pass back over the cam face of the plate $N'$, and be forced into a notch $n'$ therein, by the action of a leaf spring $O^{10}$, secured to the upright $J^3$, thus moving the movable clamp $K^5$, away from the stationary clamp $K^4$. The clamps now begin their forward movement, being impelled by a cam P, secured to the end of the shaft $J^2$, and whose face works against a pin $P'$, that projects laterally from an arm $P^2$, secured to the slide $K^6$, whereby they are brought into proper position to receive the needle next to be operated upon. Simultaneously with the beginning of the forward movement of the clamps, the cylinder or tube $M^2$, with its gripping jaws $M^5$, which constitutes the chuck, begins its backward movement, being pushed by a cam Q, secured to the driving-shaft D, which cam acts upon a pin $Q'$, projecting from the reciprocating strip $M^8$. When the pin $L^8$ in the swivel-head $L^7$, strikes against the inclined face $l^2$ of the cam $L^5$, the pin $Q'$ on the strip $M^8$ passes into a recess $Q^a$ in the cam Q, and remains inactive. At this point a straight acting face $Q^2$ on a second cam $Q^3$, also secured to the main driving-shaft, engages a second pin $Q^4$ on the strip $M^8$, and moves the pin $L^8$ up to the end of the inclined face $l^2$ of the cam $L^5$, the swivel head $L^7$ being turned on its swivel by means of said pin $L^8$, working against said inclined face, to present the needle-point to the mechanism for punching an eye therein, the swivel head ceasing its backward movement during such turning.

I will now describe the eye punching mechanism. The letter R, represents a foundation block or stock upon which lies a lower plate $R'$ and an upper plate $R^2$. The stock R and the upper plate $R^2$ are both provided with slots, such as $r$, through which pass bolts $R^3 R^3$, which also pass through holes in the lower plate $R'$ for securing them to each other and to the stock or block R. The slots $r$ are elongated, whereby the plates $R'$ and $R^2$ and the punching mechanism carried thereby, may be adjusted as occasion may demand, and said plates are adjusted by and secured in their position of adjustment by set-screws $R^4$, passing through downwardly extending flanges $r'$ thereon, and binding against the stock or block R, and lower plate $R'$. Upon the plate $R^2$ is carried a plunger casing $R^5$, the front face of which is slotted as at $R^6$ (Fig. 5) and provided with a vertical hole, within which works a plunger $R^7$, provided at its lower end with a bore, receiving a punch $R^8$, and communicating with a longitudinal recess $R^9$, in which is pivoted a punch clamp $R^{10}$. At the upper end, this clamp $R^{10}$ is formed with a finger-piece $R^{11}$, which, when pressed toward the plunger, releases the engagement of its lower end with the punch, permitting the removal of said punch, if it should break, or for any other purpose, and its replacement by another punch. Passing through the finger-piece $R^{11}$, and adapted to bind against the plunger, is a screw $R^{12}$, which when properly turned, throws the lower end of the clamp $R^{10}$ into firm engagement with the punching-awl, clamping it securely in place. When turned in the opposite direction, it permits the finger-piece to be operated to release the clamp on said punching-awl. The clamp $R^{10}$ extends beyond the surface of the plunger, and enters the longitudinal slot $R^6$ in the plunger-casing $R^5$, thus preventing the plunger from rotating or turning in its guide, and guiding it in its reciprocating movements. A cross-head S, is provided at the upper end of the plunger, against the under surface of which bears one end of a strong spiral spring $S'$, which rests in a seat provided therefor in the plunger-casing. This spring acts to raise the plunger and punching-awl after the eye has been punched in the needle. Immediately below the plunger and in the path of the punching-awl, is arranged a die $S^2$, seated in a block $S^3$, secured to the adjustable plate $R^2$. This die is provided with a groove $S^4$, adapted to receive the needle lengthwise as it is presented by the chuck $M^2$, and is also provided with a vertical hole $s$, into which the punching awl enters after it passes through the needle to form the eye therein. At the front end of the block $S^3$ in front of the die $S^2$, is secured a guide or stop $S^5$, whose operating edge lies directly in line with the groove $S^4$, so that the needle blank is accurately guided into proper position to be acted upon by the punching-awl. In rear of the plunger-casing an upright $S^6$ is secured to the plate $R^2$, and near the lower portion thereof is fulcrumed a lever $S^7$, in an adjustable boxing $S^8$, carried in a seat in the upright $S^6$, and controlled by a set-screw $S^9$. The front end of this lever $S^7$ is perforated as at $S^{10}$ (Fig. 4) the perforation lying in the path of the punching-awl, and said end of the lever operates as a holder or presser to press upon and firmly hold the needle in position, while the punching-awl is punching an eye therein. The rear end of the lever $S^7$ is extended into an arm which rests upon the free end of an arm S¹¹, pivoted to a standard S¹², secured to the base-plate A, and said free end is provided with a cam projection S¹³, which works upon a cam S¹⁴, of a wheel or disk S¹⁵, mounted upon the main driving-shaft D. Pivoted to the standard or upright S⁶, near the upper end, is a lever T, whose forward end bears upon the head of the plunger R⁷, and at its rear end it is loosely connected by a rod T$^a$ with the free end of an arm T', said rod being stepped into a suitable recess in the latter, and said arm being similar to arm S¹¹, and pivotally connected to the standard S¹². Upon the periphery of the wheel or disk S¹⁵, at one side and slightly in rear of the cam S¹⁴, is formed a cam T², which engages a projection $t$ on the pivoted arm T'. At the moment the needle is presented in the groove S⁴ of the die S², the cam S¹⁴ raises the free end of the arm S¹¹, and with it the rear end of the lever S⁷, depressing the front or holding end of said lever, at which time the cam T² elevates the rear end of the lever T, through the medium of the pivoted arm T', thus depressing the front end of said lever, and throwing down the plunger and its attached punching-awl to pierce the eye of the needle, after which the awl is raised by the spring S', and the presser-lever is raised by reason of its overbalancing weight in rear of its fulcrum. It will be observed that the parallel disposition of the punching awl and the oppositely disposed co-operating groove cutters enables the grooves and the eye to be accurately cut and punched in two positions, and this is assisted by the swivel head or turret which bears a non-rotatable or substantially fixed chuck, and whereby the rotation of the needle is entirely avoided. At this time the pin Q' on the reciprocating strip M⁸ is again engaged by the periphery of the cam Q, and the sliding support and the needle-carrier continue their backward movement, until the rear end of the rod M⁴ in the tube M², comes in contact with the abutment M⁶, when the spring jaws M⁵ separate and the needle can be readily removed. The operation can now be repeated upon another needle-blank.

I am aware that a machine for automatically performing both the operation of grooving and that of punching the eye in needle blanks is not broadly new and I do not therefore lay claim thereto.

Having thus described my invention, what I claim as new, and desire to secure by Letters Patent, is—

1. In a machine for grooving and punching needle-blanks, the combination with two groove-cutters located opposite each other, of punching mechanism including a punch located in the same plane as the cutters, and means including an oscillating head and a non-rotatable chuck, for automatically transferring the grooved needle blanks from the said groove cutters to the punch of the punching mechanism, substantially as described, and whereby the operations of grooving and punching the needles are accomplished at two points, and without rotating the needles.

2. In a machine for grooving and punching needle blanks, the combination with feeding mechanism, of two groove-cutters located opposite each other, punching mechanism including a punch located in the same plane as the said groove-cutters, a non-rotatable chuck for transferring the needles from the groove-cutters to the punch of the punching mechanism, an oscillating head on which the said chuck is mounted, and a reciprocating carrier for the said head, substantially as described, and whereby the operations of grooving and punching the needles are accomplished at two points and without rotating the needles.

3. In a machine for grooving and punching needle-blanks, the combination with grooving cutters and punching mechanism, of a needle-carrier secured to a swivel-head, and a reciprocating slide on which said head is swiveled, substantially as described.

4. In a machine for grooving and punching needle-blanks, the combination with grooving cutters and punching mechanism, a reciprocating swivel head, a needle-carrier secured to said swivel head, and a cam lying in the path of said swivel head for turning the same to present a needle to the punching mechanism after it has been grooved by the grooving cutters, substantially as described.

5. In a machine for grooving and punching needle-blanks, the combination with grooving cutters and punching mechanism, of a reciprocating swivel head, a needle-carrier secured thereto, a cam lying in the path of said swivel head, and a pin connected with said swivel head to engage said cam and turn the swivel head to transfer a needle to the punching mechanism after it has been grooved, substantially as described.

6. In a machine for grooving and punching needle-blanks, the combination with grooving cutters and punching mechanism, of a reciprocating swivel-head, needle-carrying mechanism secured thereto, a sliding plate carrying a cam lying in the path of said swivel-head, and a pin secured to said swivel head to engage said cam, substantially as described.

7. In a machine for grooving and punching needle-blanks, the combination with grooving cutters and punching mechanism, of needle feeding devices, a reciprocating swivel head, a needle carrier secured to said head, means for moving said head and carrier forward to present a needle to the grooving cutters, a cam lying in the path of said swivel head, and a pin secured to said swivel head to engage said cam and turn the swivel head to transfer a needle to the punching mechanism after it has been grooved, and means for retiring said head to bring the carrier into position to receive another needle from the needle-feeding devices, substantially as described.

8. In a machine for grooving and punching needle-blanks, a feeding device comprising a hopper having a slotted bottom, a carrier belt running in said slotted bottom, and a removable follower for said hopper, constructed with a corrugated lower edge, substantially as described.

9. In a machine for grooving and punching needle-blanks, a feeding device comprising a hopper having a slotted bottom, a removable follower for said hopper, constructed with a corrugated lower edge, and means for vibrating the said removable follower, substantially as described.

In testimony whereof I have signed this specification in the presence of two subscribing witnesses.

IRA T. SMITH.

Witnesses:
FRED C. EARLE,
J. H. SHUMWAY.